US012802389B2

(12) United States Patent
Yonezawa

(10) Patent No.: US 12,802,389 B2
(45) Date of Patent: Nov. 17, 2026

(54) IMAGE ANALYSIS SYSTEM, IMAGE ANALYSIS METHOD, AND NON-TRANSITORY COMPUTER-READABLE MEDIUM

(71) Applicant: NEC Corporation, Tokyo (JP)

(72) Inventor: Yaeko Yonezawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 18/697,107

(22) PCT Filed: Oct. 12, 2021

(86) PCT No.: PCT/JP2021/037745
§ 371 (c)(1),
(2) Date: Mar. 29, 2024

(87) PCT Pub. No.: WO2023/062724
PCT Pub. Date: Apr. 20, 2023

(65) Prior Publication Data

US 2024/0412478 A1 Dec. 12, 2024

(51) Int. Cl.
*G06V 10/25* (2022.01)
*G06V 10/74* (2022.01)

(52) U.S. Cl.
CPC ............ *G06V 10/25* (2022.01); *G06V 10/761* (2022.01)

(58) Field of Classification Search
CPC .... G06V 10/25; G06V 10/761; G06V 10/462; G06Q 10/08; G06T 7/00; Y02P 90/30
See application file for complete search history.

(56) References Cited

U.S. PATENT DOCUMENTS

2011/0011936 A1 1/2011 Morandi et al.
2017/0193430 A1* 7/2017 Barreira Avegliano ..................... G06V 20/52
2017/0278056 A1* 9/2017 Itou ...................... G06Q 10/087
2020/0012878 A1 1/2020 Iio et al.
(Continued)

FOREIGN PATENT DOCUMENTS

CN 110069980 A * 7/2019 ........... G06F 16/583
JP 2006-059038 A 3/2006
JP 2018-132869 A 8/2018
(Continued)

OTHER PUBLICATIONS

Translated version of JP 2020068006 (Year: 2020).*
(Continued)

*Primary Examiner* — Carol W Chan

(57) ABSTRACT

An image analysis system (1) includes a product area detection unit (110), a same product area determination unit (120), and a product identification unit (130). The product area detection unit (110) detects a product area of each product from an image capturing a plurality of products. The same product area determination unit (120) determines, based on a result of comparing adjacent product areas with each other, a same product area being an area where a plurality of same products are displayed. The product identification unit (130) selects, as a target, at least one product area from a plurality of product areas included in the same product area, and identifies a product displayed in the same product area by processing the at least one product area selected as the target.

9 Claims, 14 Drawing Sheets

(56) References Cited

U.S. PATENT DOCUMENTS

| | | | | |
|---|---|---|---|---|
| 2020/0394599 | A1 | 12/2020 | Akatsuka | |
| 2023/0039355 | A1* | 2/2023 | Nabeto | G06F 16/9014 |

FOREIGN PATENT DOCUMENTS

| | | | |
|---|---|---|---|
| JP | 2020068006 | A * | 4/2020 |
| WO | 2014/087725 | A1 | 6/2014 |
| WO | 2019/107157 | A1 | 6/2019 |

OTHER PUBLICATIONS

International Search Report for PCT Application No. PCT/JP2021/037745, mailed on Jan. 18, 2022.

English translation of Written opinion for PCT Application No. PCT/JP2021/037745, mailed on Jan. 18, 2022.

Akatsuka, Hayato and 2 others. "Product Shelf Analysis Solution Using Image Recognition-Comprehensive understanding of product display information from images", NTT Technical Journal., Aug. 1, 2018, vol. 30, No. 8, ISSN:0915-2318.

* cited by examiner

IMAGE ANALYSIS SYSTEM, IMAGE ANALYSIS METHOD, AND NON-TRANSITORY COMPUTER-READABLE MEDIUM

This application is a National Stage Entry of PCT/JP2021/037745 filed on Oct. 12, 2021, the contents of all of which are incorporated herein by reference, in their entirety.

TECHNICAL FIELD

The present invention relates to a technique for identifying a product by using an image.

BACKGROUND ART

A technique exists in which image processing is executed on an image of a place where a product such as a product in a store is displayed and thereby the product displayed at the place is identified. In such a technique, there is a case in which product identification fails or a product is incorrectly identified due to various factors. Therefore, a technique for improving product identification accuracy is desired.

One example of a technique for improving product identification accuracy is disclosed in, for example, the following Patent Document 1. In Patent Document 1, a technique in which a product area of each product is detected from an image of a product shelf on which a plurality of products are displayed, and validity of a product recognition result related to a target product area is determined based on relevance between product recognition results for the target product area and an adjacent product area is disclosed.

RELATED DOCUMENT

Patent Document

Patent Document 1: International Patent Publication No. WO2019/107157

SUMMARY OF INVENTION

Technical Problem

Basically, an amount of arithmetic operation for processing of identifying a product by using an image is large. When each of a plurality of products included in an image of a product shelving unit and the like is identified by using the image, a required amount of arithmetic operation (processing load) becomes large. The larger the processing load, the longer response time becomes, and thereby usability may be reduced.

The present invention is made in view of the above-described problem. One of objects of the present invention is to provide a technique for reducing an overall processing load of product identification processing using an image capturing a plurality of products.

Solution to Problem

An image analysis system according to the present disclosure includes:

a product area detection unit that detects a product area of each product from an image capturing a plurality of products;

a same product area determination unit that determines a same product area being an area where a plurality of same products are displayed, based on a result of comparing adjacent product areas with each other; and a product identification unit that selects, as a target, at least one product area from a plurality of product areas included in the same product area, and identifies a product displayed in the same product area by processing the at least one product area selected as the target.

An image analysis method according to the present disclosure includes, by a computer:

detecting a product area of each product from an image capturing a plurality of products;

determining a same product area being an area where a plurality of same products are displayed, based on a result of comparing adjacent product areas with each other;

selecting, as a target, at least one product area from a plurality of product areas included in the same product area; and identifying a product displayed in the same product area by processing the at least one product area selected as the target.

A program according to the present disclosure causes a computer to execute the above-described image analysis method.

Advantageous Effects of Invention

According to the present invention, an overall processing load of product identification processing using an image capturing a plurality of products can be reduced.

DESCRIPTION OF EMBODIMENTS

Figure 1:
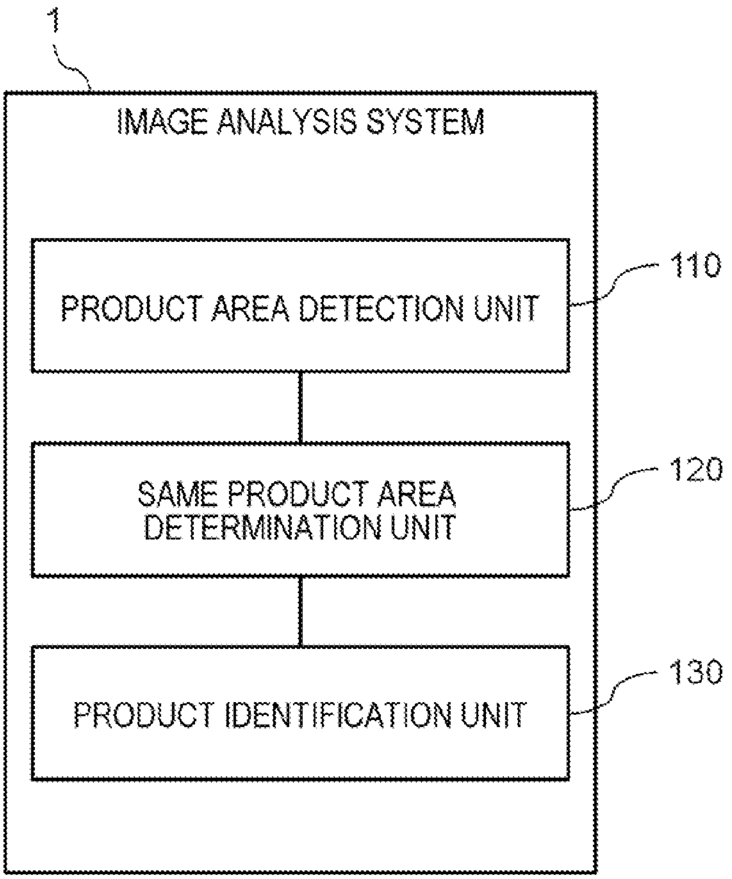
FIG. 1 It is a diagram illustrating a functional configuration of an image analysis system according to a first example embodiment.

In the following, example embodiments of the present invention will be described with reference to the drawings. Note that, in all the drawings, a similar component is denoted with a similar reference sign, and description thereof will not be repeated as appropriate. Further, unless otherwise described, each block in each of the block diagrams represents a functional unit component rather than a hardware unit component. Further, a direction of an arrow in the drawings is simply for clarification of an information flow. Unless otherwise described, a direction of an allow does not limit a direction of communication (one-way communication/two-way communication).

First Example Embodiment

<Functional Configuration Example>

FIG. 1 is a diagram illustrating a functional configuration of an image analysis system according to a first example embodiment. An image analysis system 1 illustrated in FIG. 1 includes a product area detection unit 110, a same product area determination unit 120, and a product identification unit 130.

The product area detection unit 110 acquires an image capturing a plurality of products. Further, the product area detection unit 110 detects an image area of each of the products in the acquired image. In the following description, the image area of each of the products is also referred to as a "product area". The same product area determination unit 120 determines an area where same products are displayed, based on similarity among a plurality of the product areas detected from the image. Note that, in the following description, the area where the same products are displayed is also referred to as a "same product area". For example, the same product area determination unit 120 targets product areas adjacent to each other, and compares the adjacent product areas with each other. For example, the same product area determination unit 120 can determine similarity between the adjacent product areas, based on an image feature value (for example, information indicating an appearance feature of a product in an area, such as a feature value related to color and shape) that can be extracted from each of the product areas. In this way, the same product area determination unit 120 determines whether same products are displayed, based on similarity between adjacent product areas, specifically, similarity in appearance features of adjacent products. Note that, although the same product area determination unit 120 determines whether products are same, but does not determine (i.e., identify) what the product is. Processing of identifying a product in the image is executed by the product identification unit 130 described below. The product identification unit 130 selects, as a target, at least one product area from the plurality of product areas included in the same product area determined by the same product area determination unit 120. Further, by processing the at least one product area selected as the target, the product identification unit 130 identifies the product displayed in the same product area.

For example, it is assumed that an image in which three products are displayed in a row is acquired as a processing target image. In this case, the product area detection unit 110 detects three product areas from the processing target image. It is further assumed that a result of comparing each of the product areas with an adjacent area by the same product area determination unit 120 indicates that a similarity of each of the three product areas to the adjacent product area is equal to or more than a criterion. In this case, the same product area determination unit 120 determines an area including these three product areas as a same product area. For F example, the same product area determination unit 120 assigns same information to each of the three product areas, as identification information related to the same product area. For example, information such as a "same product area ID: 001" is assigned to each of the three product areas, as information indicating the same product area. In this case, by referring to a same product area ID assigned to each product area, a functional unit in a system can determine which same product area each product area is included in. In the specific example exemplified herein, the product identification unit 130 can determine the three product areas to which the "same product area ID: 001" is assigned, by executing a search by using the information "same product area ID: 001". Further, from among the product areas determined in such a way, the product identification unit 130 selects one or more product areas at random or in accordance with a predetermined rule, and identifies a product on a per-same product area basis.

<Hardware Configuration of Image Analysis System 1>

Each functional configuration unit of the image analysis system 1 may be achieved by hardware that achieves each functional configuration unit (e.g., hard-wired electronic circuit and the like), or may be achieved by a combination of hardware and software (e.g., a combination of an electronic circuit and a program for controlling the electronic circuit, and the like). In the following, a case in which each functional configuration unit of the image analysis system 1 is achieved in a single information processing apparatus by a combination of hardware and software is further described.

Figure 2:
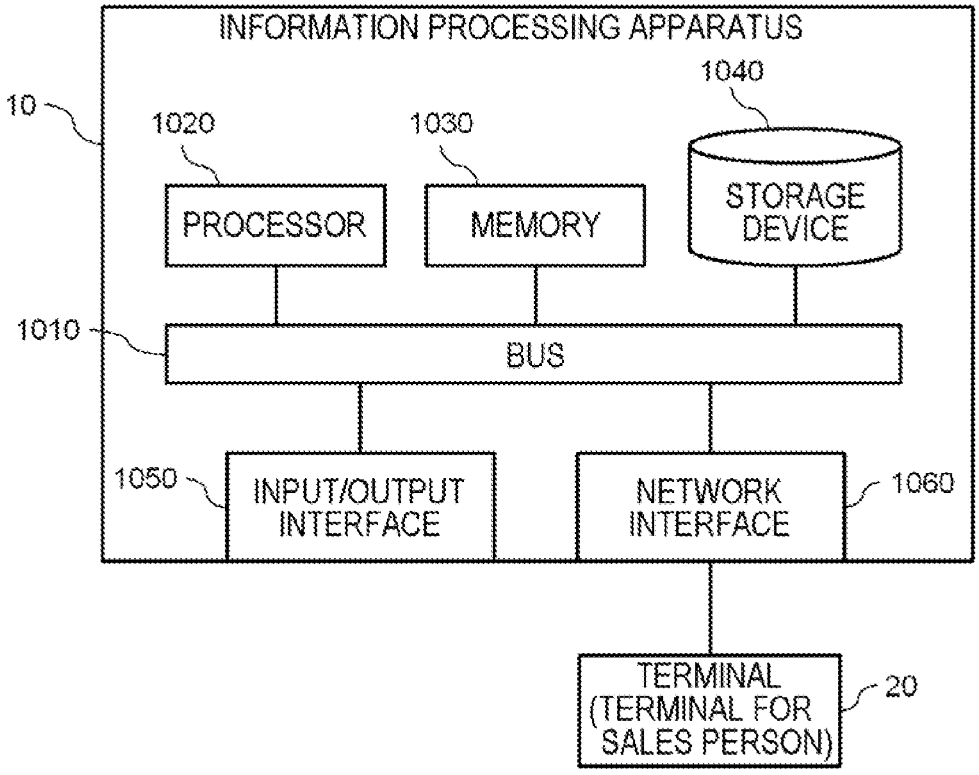
FIG. 2 It is a block diagram illustrating a hardware configuration of an information processing apparatus including each functional configuration unit of the image analysis system.

FIG. 2 is a block diagram illustrating a hardware configuration of an information processing apparatus 10 including each functional configuration unit of the image analysis system 1. The information processing apparatus 10 includes a bus 1010, a processor 1020, a memory 1030, a storage device 1040, an input/output interface 1050, and a network interface 1060.

The bus 1010 is a data transmission path for the processor 1020, the memory 1030, the storage device 1040, the input/output interface 1050, and the network interface 1060 to transmit and receive data to and from one another. However, a method of connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function of the image analysis system 1 described in the present specification. By the processor 1020 reading the program module on the memory 1030 and executing the program module, each function (the product area detection unit 110, the same product area determination unit 120, the product identification unit 130, and the like) of the image analysis system 1 described in the present specification is achieved.

The input/output interface 1050 is an interface for connecting the information processing apparatus 10 to peripheral equipment. An input apparatus such as a keyboard, a mouse, and a touch panel, and an output apparatus such as a display and a monitor can be connected to the input/output interface 1050.

The network interface 1060 is an interface for connecting the information processing apparatus 10 to a network. This network is, for example, a local area network (LAN) or a wide area network (WAN). A method of connecting to the network via the network interface 1060 may be wireless connection or may be wired connection. As one example, the information processing apparatus 10 can communicate via the network interface 1060 with a terminal 20 held by a sales person, another external apparatus, and the like that are connected to the network.

Note that, the hardware configuration illustrated in FIG. 2 is merely one example. The hardware configuration of the image analysis system 1 according to the present disclosure is not limited to the example in FIG. 2. For example, various functions of the image analysis system 1 according to the present disclosure may be implemented in a single information processing apparatus, or may be implemented in a plurality of information processing apparatuses in a distributed way. Further, in the example in FIG. 2, the information processing apparatus 10 provided with each function of the image analysis system 1 is illustrated as an apparatus different from the terminal 20 used by a sales person, however, all or some of the functions of the image analysis system 1 may be provided in the terminal 20 used by a sales person.

<Processing Flow>

Figure 3:
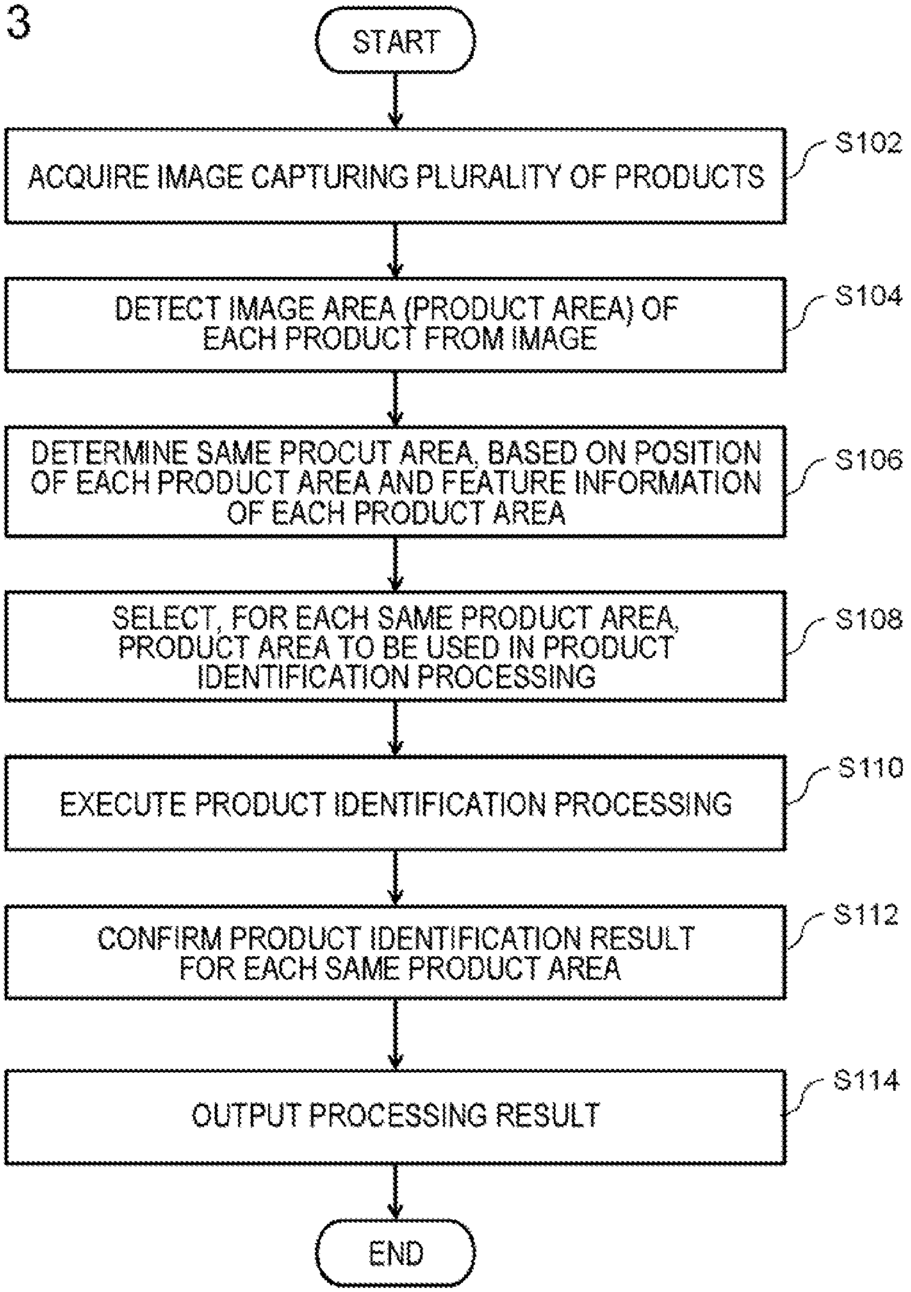
FIG. 3 It is a flowchart illustrating a flow of processing executed by the image analysis system according to the first example embodiment.

FIG. 3 is a flowchart illustrating a flow of processing executed by the image analysis system 1 according to the first example embodiment.

First, the product area detection unit 110 acquires, as a processing target image, an image capturing a plurality of products captured by an unillustrated imaging apparatus (S102). The processing target image is, for example, captured by using a camera mounted on a terminal (for example, the terminal 20 illustrated in FIG. 2) held by a sales person. The sales person captures an image of a place (such as a product shelving unit) where a product is displayed, by using a camera function of the terminal. The product area detection unit 110 can acquire the image of the products from the terminal or from an unillustrated server apparatus that collects and accumulates an image generated by the terminal.

Then, the product area detection unit 110 detects an image area (product area) associated to each object (product) from the acquired image (S104). The product area detection unit 110 can recognize each object (an object being supposed to be some kind of product) in the image by using, for example, an object recognition model (unillustrated) learned using a machine learning algorithm such as Deep Learning. "Recognition" referred to herein includes determining a position (e.g., a position coordinate in an image coordinate system) of an image area associated to an object. As one example, the object recognition model is, for example, preliminarily stored in the storage device 1040 of the information processing apparatus 10 in FIG. 2. As another example, the object recognition model may be stored in an external apparatus (unillustrated) being communicably connected to the information processing apparatus 10 in FIG. 2 via the network interface 1060.

The same product area determination unit 120 determines an area where products that are same products are displayed, based on a position of each product area detected by the product area detection unit 110 and feature information of each product area (S106). For example, by extracting an image feature value from each of two product areas adjacent to each other and comparing the extracted feature values with each other, the same product area determination unit 120 can compute a matching degree (similarity) of those two product areas. Further, when the matching degree (similarity) of the two product areas is equal to or more than a predetermined reference value, the same product area determination unit 120 determines that same products are displayed in the two product areas. For example, the same product area determination unit 120 assigns same information to the two product areas where the same products are determined to be displayed, as identification information related to a same product area. By the same product area determination unit 120 assigning such information, an area where same products are displayed in the processing target image is set. Note that, the predetermined reference value used for determining a same product area is, for example, adjusted to an appropriate value, based on a result of comparison being experimentally conducted by using a product image, and preliminarily stored in a storage area that can be accessed by the same product area determination unit 120.

The product identification unit 130 selects, for each same product area determined by the same product area determination unit 120, a product area to be used in product identification processing (S108). For example, when an image of a product shelving unit on which two kinds of products are displayed is acquired as a processing target image, a first same product area related to one of the two kinds of products and a second same product area related to the other are set in the above-described processing in S106. In this case, the product identification unit 130 selects a product area to be used in the product identification processing, for each of the first same product area and the second same product area. Note that, the product identification unit 130 can select a product area to be used in the product identification processing, in accordance with any rule.

As one example, the product identification unit 130 acquires keypoints for each of a plurality of product areas included in the same product area, and selects a product area to be used in the product identification processing, based on the number of keypoints of each product area. Specifically, the product identification unit 130 selects a product area of which number of keypoints is largest in the same product area, as a product area to be used in the product identification processing. Alternatively, the product identification unit 130 may select one or more product areas of which number of keypoints is equal to or more than a predetermined threshold value, as a product area to be used in the product identification processing. The larger the number of acquired keypoints, the higher a possibility of acquiring a correct identification result as a result of product identification by the product identification unit 130. As another example, the product identification unit 130 may select a predetermined number of product areas or predetermined percentage (for example, 50% or the like) of product areas at random from the product areas included in the same product area.

Then, the product identification unit 130 executes the product identification processing by using the product area selected for each same product area, on a per-same product area basis (S110). The product identification unit 130 can acquire a product identification result related to the product area (partial image) selected in the processing in S108, for example, by giving, as an input, the product area to a product recognition model preliminarily learned in such a way as to be able to identify various products. Further, the product identification unit 130 can acquire a product identification result related to the product area (partial image) selected in the processing in S108, for example, by comparing the product area with product master information for the product identification processing preliminarily prepared for each product.

Figure 4:
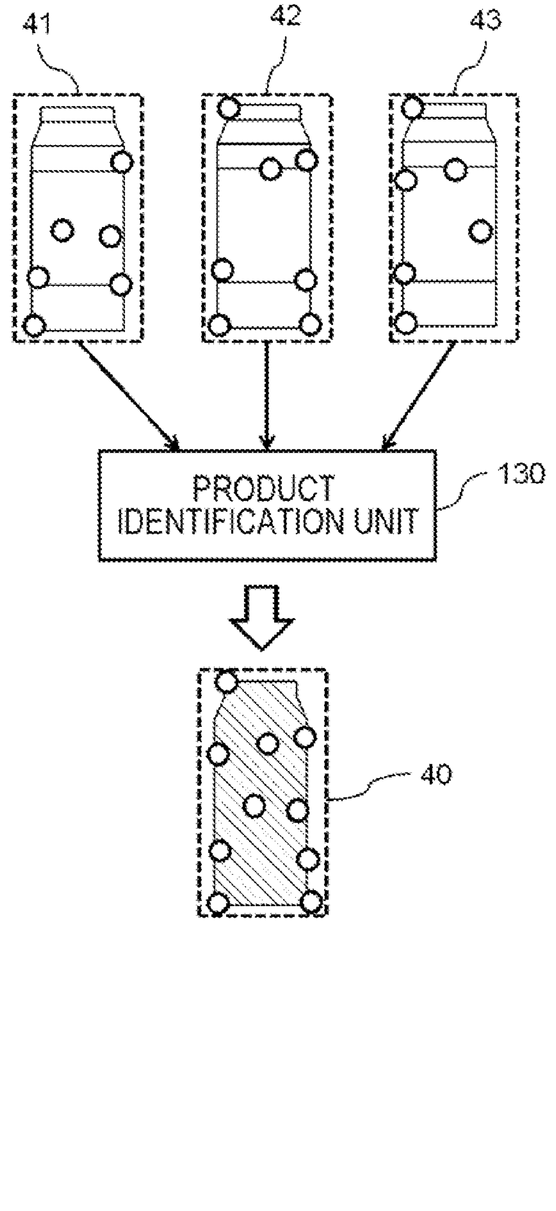
FIG. 4 It is a diagram for describing an operation of identifying a product by using a result of adding up key-points of a plurality of product areas.

When a plurality of product areas are selected herein in order to be used in product identification processing for a specific same product area, the product identification unit 130 may identify a product by using a result of adding up keypoints of the plurality of product areas. In this case, since a missing keypoint in an individual product area can be compensated for by a keypoint of another product area, an advantageous effect of improving accuracy of the product identification processing can be expected. This will be described with reference to FIG. 4. FIG. 4 is a diagram for describing an operation of product identification by using a result of adding up keypoints of a plurality of product areas. In the example in FIG. 4, a state in which three product areas 41 to 43 are selected from a same product area related to a specific product is illustrated. Note that, each circle in each area represents a keypoint. As illustrated in FIG. 4, positions and the number of key points of each of the three product areas 41 to 43 are at least partially different from one another. As illustrated, the product identification unit 130 adds up the keypoints of the three product areas and thereby generates information for identification 40 to be used in product identification processing. Then, the product identification unit 130 executes the product identification processing by using the information for identification 40 generated in this way. As illustrated, the information for identification 40 includes a result of adding up the keypoints that the three product areas 41 to 43 have. Thus, by adding up keypoints of a plurality of product areas selected from a range of a same product area, the number of keypoints used at one piece of product identification processing is increased. Consequently, identification accuracy of a product in an image is improved.

Further, the product identification unit 130 confirms a product identification result for each same product area, based on a result of the processing in S110 (S112). When one product area is selected for a specific same product area in the processing in S108, the product identification unit 130 confirms a product identification result acquired by using the selected product area, as a product identification result for the entire same product area. Further, when a plurality of product areas are selected for a specific same product area in the processing in S108, the product identification unit 130 confirms a product identification result for the entire same product area, based on a product identification result for each of the plurality of product areas. For example, the product identification unit 130 confirms, as a product identification result for the same product area, a product identification result being acquired most frequently. Alternatively, the product identification unit 130 may confirm, as a product identification result for the same product area, a product identification result having a highest matching degree (some kind of score acquired in the identification processing) among product identification results acquired by using the plurality of product areas. Then, the product identification unit 130 outputs a final processing result to an output apparatus (S114).

The above-described processing will be more specifically described with reference to the drawings. Note that, the processing described below is merely one example, and the processing by the image analysis system 1 according to the present disclosure is not limited to a content described in the following.

Figure 5:
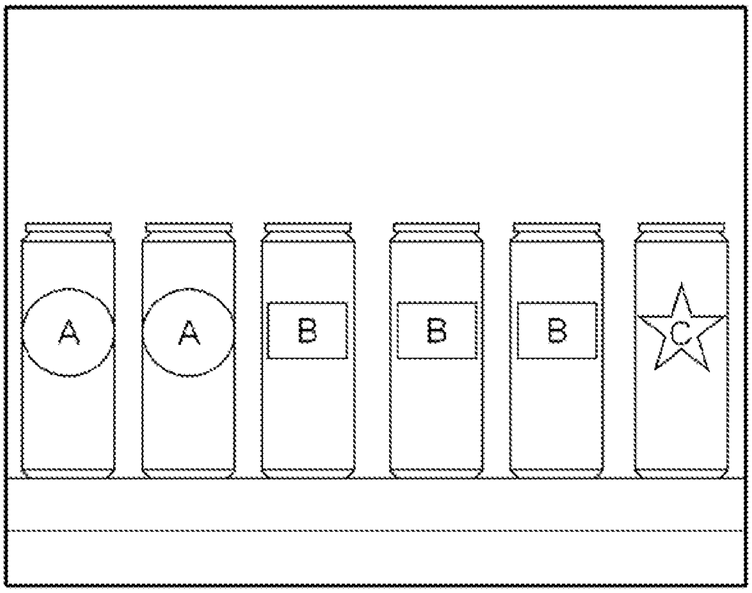
FIG. 5 It is a diagram illustrating one example of an image given as a processing target to the image analysis system.

FIG. 5 is a diagram illustrating one example of an image given as a processing target to the image analysis system 1. When acquiring an image such as illustrated in FIG. 5, the product area detection unit 110 detects, as illustrated in FIG. 6, an image area associated to each object (product) in the image, by using an object recognition model, for example, stored in the storage device 1040 of the information processing apparatus 10 in FIG. 2, and the like.

Figure 6:
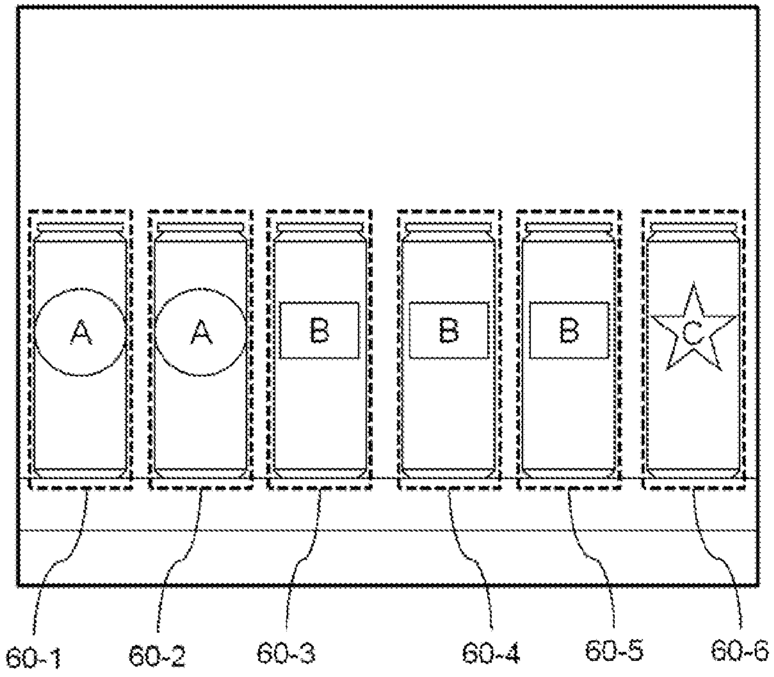
FIG. 6 It is a diagram illustrating an image area of each product captured in the image in FIG. 5.

FIG. 6 is a diagram illustrating an image area of each product captured in the image in FIG. 5. The product area detection unit 110 determines a plurality of image areas (product areas) in the image, as illustrated as dot-lined rectangles in FIG. 6. Note that, when distinguishing each of the product areas in the following description, as illustrated, reference signs 60-1 to 60-6 are used. In this occasion, for example, the product area detection unit 110 generates, for each of the product areas 60-1 to 60-6, information indicating a shape of the area (e.g., information indicating positional information of each vertex on the image and connections of each vertex), and stores the generated information in a predetermined storage area (e.g., the storage device 1040 of the information processing apparatus 10 in FIG. 2). On a basis of the information stored in this way, the same product area determination unit 120 can determine a positional relationship of the product area associated to each of the plurality of objects (products) in the image.

Figure 7:
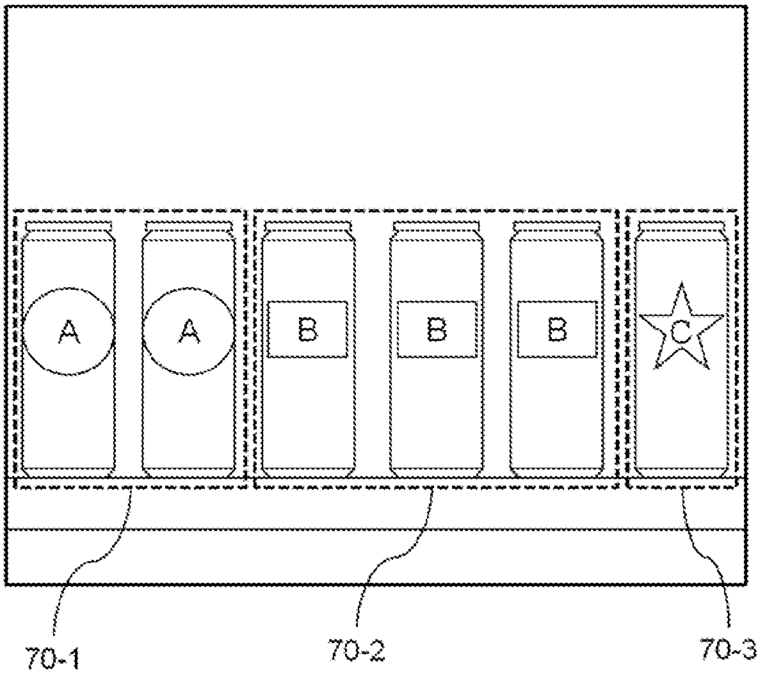
FIG. 7 It is a diagram illustrating a result of determining a same product area by a same product area determination unit.

The same product area determination unit 120 determines a same product area, based on a positional relationship and similarity of each of the plurality of product areas detected as illustrated in FIG. 6. For example, the same product area determination unit 120 generates image feature information on each of the plurality of image areas, and determines similarity in image features of adjacent product areas. It is assumed that, according to a state of product display in the image, each of a similarity of the product area 60-1 and product area 60-2 and a similarity of the product area 60-3 to the product area 60-5 is equal to or more than a predetermined threshold value. Further, it is assumed that, according to the state of product display in the image, no other product area of which a similarity is equal to or more than the predetermined threshold value is found for the product area 60-6. In this case, the same product area determination unit 120 determines that three same product areas exist, for example, as illustrated in FIG. 7. FIG. 7 is a diagram illustrating a result of determination of a same product area by the same product area determination unit 120. In the example in FIG. 7, the same product area determination unit 120 sets, in the image, three same product areas, a first same product area 70-1 including the product area 60-1 and 60-2 in FIG. 6, a second same product area 70-2 including the product areas 60-3 to 60-5 in FIG. 6, and a third same product area 70-3 including the product area 60-6 in FIG. 6.

The product identification unit 130 selects a product area to be used in product identification processing from each of the three same product areas illustrated in FIG. 7. For example, the product identification unit 130 selects, for each of the first same product area 70-1, the second same product area 70-2, and the third same product area 70-3, one product area to be used in the product identification processing. Alternatively, for example, the product identification unit 130 may select, as a product area to be used in the product identification processing, a plurality of product areas for each of the first same product area 70-1 and the second same product area 70-2 each including a plurality of product areas.

Figure 8:
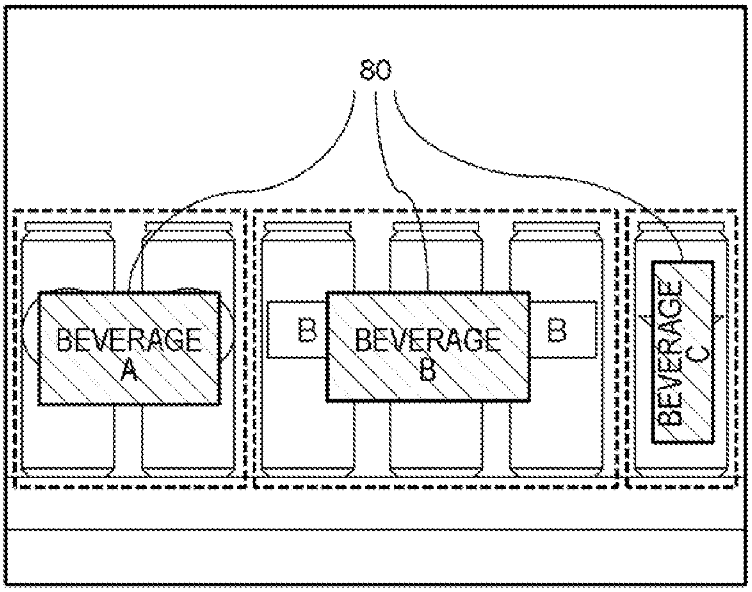
FIG. 8 It is a diagram illustrating one example of information finally output by a product identification unit.

Further, the product identification unit 130 executes the product identification processing by using the product area selected for each of the same product areas. The product identification unit 130 confirms a product identification result for each of the same product areas, based on a result of the product identification processing executed by using the product area selected for each of the same product areas. Further, the product identification unit 130 outputs information indicating a final processing result, for example, to the terminal 20 for a sales person by which the processing target image is captured. FIG. 8 is a diagram illustrating one example of information finally output by the product identification unit 130. The product identification unit 130 generates data of a processed image in which a display element 80 indicating the product identification result confirmed for each of the same product areas is superimposed on the image acquired as the processing target. Further, the product identification unit 130 transmits the generated data of the processed image, for example, to the terminal 20 for a sales person illustrated in FIG. 2, and causes an image as illustrated in FIG. 8 to be displayed on a display of the terminal 20.

Example of Advantageous Effect

In the present example embodiment, first, an area (same product area) where same products are displayed is determined from image areas of products (product areas) detected from an image, based on similarity of adjacent product areas. Further, at least one product area to be used in product identification processing is selected for each determined same product area. Further, a product identification result is confirmed based on a result of the product identification by using the product area selected for each same product area, on a per-same product area basis. Thereby, a number of executions of the product identification processing by using an image, which is basically a high-load processing, is suppressed. Note that, in the present example embodiment, processing of comparing two adjacent product areas with each other is separately executed in order to determine the same product area, but the processing is simple comparison processing of the image areas. Therefore, it can be said that an amount of load reduced by decreasing the number of times of the product identification processing is larger than an amount of load increased due to the processing executed in order to determine the same product area. As a result, according to the present example embodiment, an advantageous effect that an overall processing load in identifying each of a plurality of product by using an image in which the plurality of products are displayed is reduced can be expected.

Second Example Embodiment

The present example embodiment has a similar configuration as that of the first example embodiment, except for a point described in the following.

<Functional Configuration>

Figure 9:
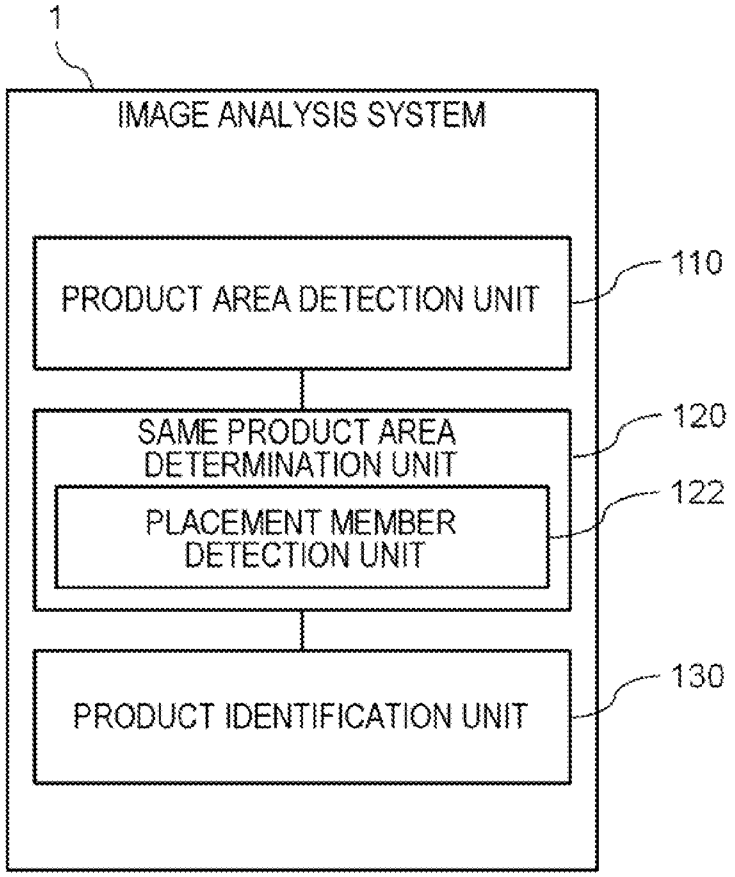
FIG. 9 It is a diagram illustrating a functional configuration of an image analysis system according to a second example embodiment.

FIG. 9 is a diagram illustrating a functional configuration of an image analysis system according to a second example embodiment. In the present example embodiment, a same product area determination unit 120 further includes a placement member detection unit 122. The placement member detection unit 122 acquires information indicating a position of an image area of a placement member (e.g., a shelf board of a product shelving unit) on which a product is placed. Further, the same product area determination unit 120 is configured in such a way as to select, based on positional information of the image area of the placement member acquired by the placement member detection unit 122, a product area to be compared in order to determine a same product area.

For example, a product shelving unit is generally provided with a plurality of shelf boards (placement members) and, in many cases, a different type of product is placed on each of the shelf boards. Therefore, when there are two product areas vertically adjacent to each other with a shelf board in between, it is likely that products placed in each of those two product areas are different from each other. Meanwhile, there is also a case in which same products are displayed stacked in a vertical direction on each shelf board. Therefore, when there are two product areas adjacent in the vertical direction to each other without a shelf board in between, it is likely that products placed in each of those two product areas are the same. On a basis of such a characteristic in displaying a product on a product shelving unit, the same product area determination unit 120 determines whether there is a placement member between two product areas adjacent in the vertical direction to each other, based on the positional information of the image area of the placement member acquired by the placement member detection unit 122. When there is a placement member between the two product areas, it can be determined that different products are likely to be placed in each of the product areas. Therefore, the same product area determination unit 120 does not determine similarity of the two product areas adjacent to each other with the placement member in between. Meanwhile, when there is no placement member between the two product areas, in other words, when products are stacked, it can be determined that same products are likely to be placed in those product areas. Therefore, the same product area determination unit 120 determines similarity of the two product areas adjacent to each other without a placement member in between.

<Processing Flow>

Figure 10:
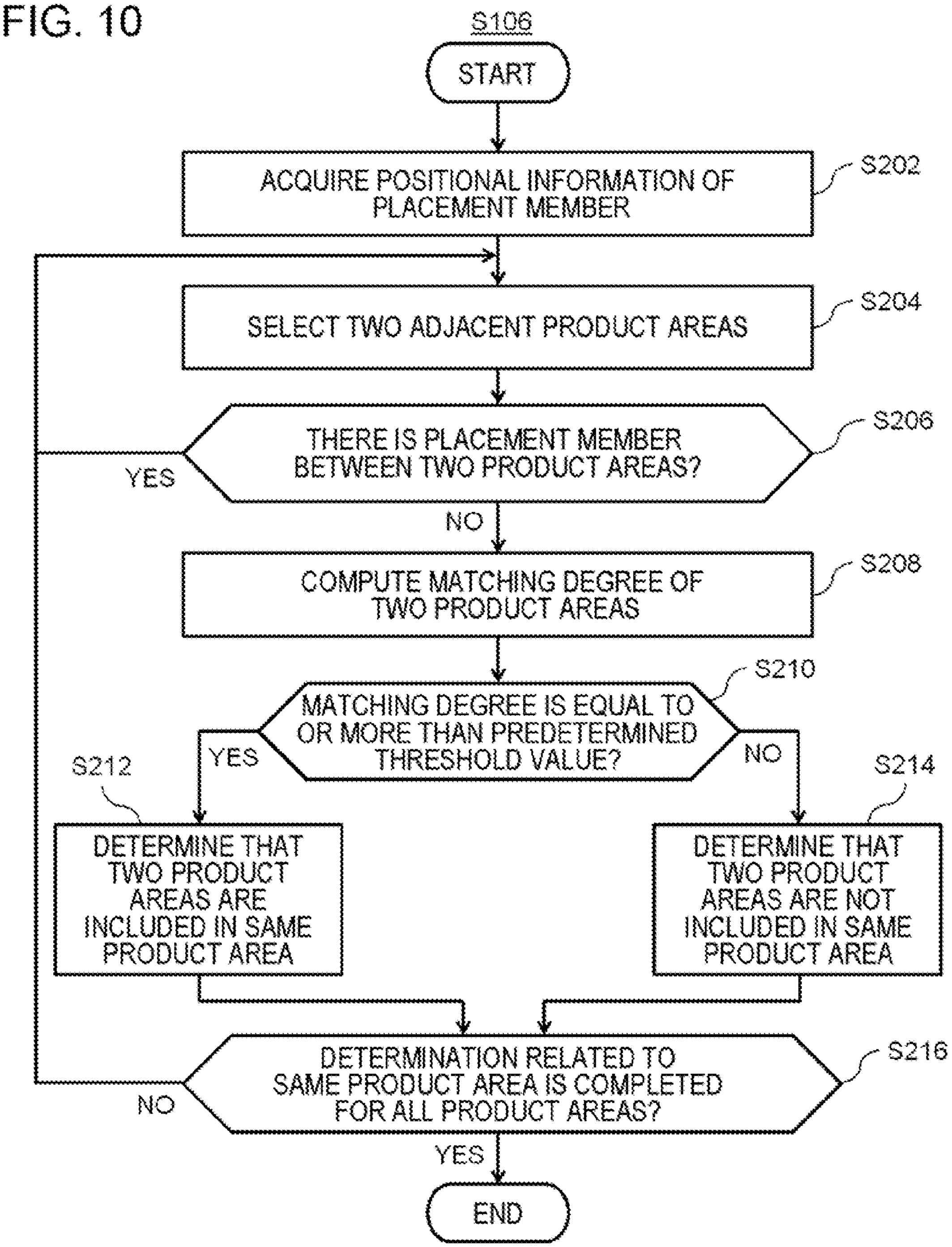
FIG. 10 It is a flowchart illustrating a specific flow of determination processing (processing in S106) of a same product area executed by a same product area determination unit according to the second example embodiment.

FIG. 10 is a flowchart illustrating a specific flow of determination processing (processing in S106) of a same product area executed by the same product area determination unit 120 according to a second example embodiment.

First, the same product area determination unit 120 detects, by using the placement member detection unit 122, a placement member from an image acquired as a processing target image, and acquires positional information of an image area of the placement member (S202). For example, the placement member detection unit 122 can detect an area of the placement member from the processing target image, by using a machine learning model that can detect an area of a product placement member (shelf board). Such a machine learning model is constructed by training by using learning data provided in advance with information indicating an area of a product placement member, and is stored in a storage device 1040 of an information processing apparatus 10 in FIG. 2, and the like.

The same product area determination unit 120 selects two adjacent product areas from the product areas detected from the image in the processing in S104 in the flowchart in FIG. 3 (S204). Then, the same product area determination unit 120 determines whether there is a placement member between the two adjacent product areas, based on the positional information of the placement member acquired in the processing in S202 (S206).

When it is determined, based on the positional information of the placement member and positional information of the two product areas, that there is a placement member between the two product areas (S206: YES), the same product area determination unit 120 ends processing for those two product areas. In this case, the same product area determination unit 120 re-selects two product areas in a different combination.

Meanwhile, when it is determined, based on the positional information of the placement member and the positional information of the two product areas, that there is no placement member between the two product areas (S206: NO), the same product area determination unit 120 computes a matching degree of those two product areas (S208). Then, the same product area determination unit 120 further determine whether the matching degree of the two product areas is equal to or more than a predetermined threshold value (S210). The threshold value used herein is preliminarily stored in, for example, a memory 1030 and the storage device 1040 of the information processing apparatus 10 in FIG. 2, and the like.

When the matching degree of the two product areas is equal to or more than the predetermined threshold value (S210: YES), the same product area determination unit 120 determines that those two product areas are included in a same product area (S212). In this case, the same product area determination unit 120 assigns same information as information indicating a same identification area to which the two product areas belong. Thereby, it is indicated that both of the two product areas are included in the common same product area. Note that, in a case of a state where one of the two product areas has already been compared with another product area and information indicating a same product area has been assigned, the same product area determination unit 120 assigns same information as the information being assigned to the one of the product areas to the other product area. In this way, the same product area expands.

Meanwhile, when the matching degree of the two product areas is less than the predetermined threshold value (S210: NO), the same product area determination unit 120 determines that those two product areas are not included in a same product area (S214). In this case, the same product area determination unit 120 assigns, as information indicating a same identification area to which each of the two product areas belongs, information different from each other. Thereby, it is indicated that each of the two product areas is included in a same product area being different from each other.

Then, the same product area determination unit 120 determines whether the determination regarding a same product area has been completed for all the product areas detected from the image (S216). When the determination regarding a same product area has not been completed for all the product areas (S216: NO), the above-described processing is repeated. Meanwhile, when the determination regarding a same product area has been completed for all the product areas (S216: YES), product identification processing by a product identification unit 130 is executed as described with reference to the flowchart in FIG. 3.

The above-described processing will be more specifically described with reference to the drawings. Note that, the processing described below is merely one example, and the processing by the image analysis system 1 according to the present disclosure is not limited to a content described in the following.

Figure 11:
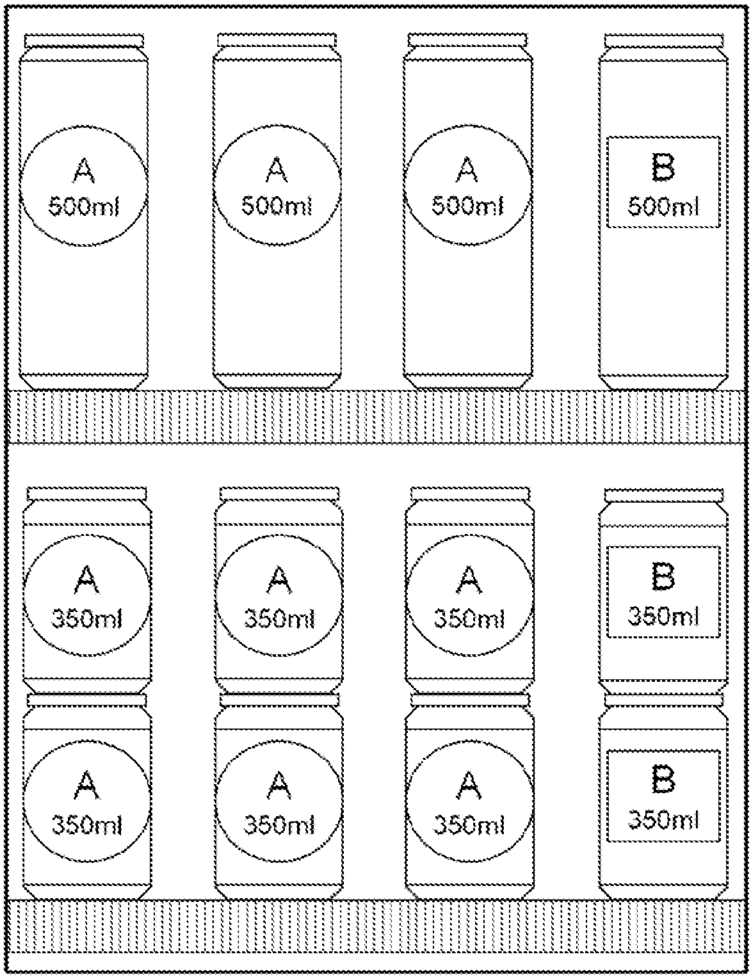
FIG. 11 It is a diagram illustrating one example of an image given as a processing target to the image analysis system.
Figure 12:
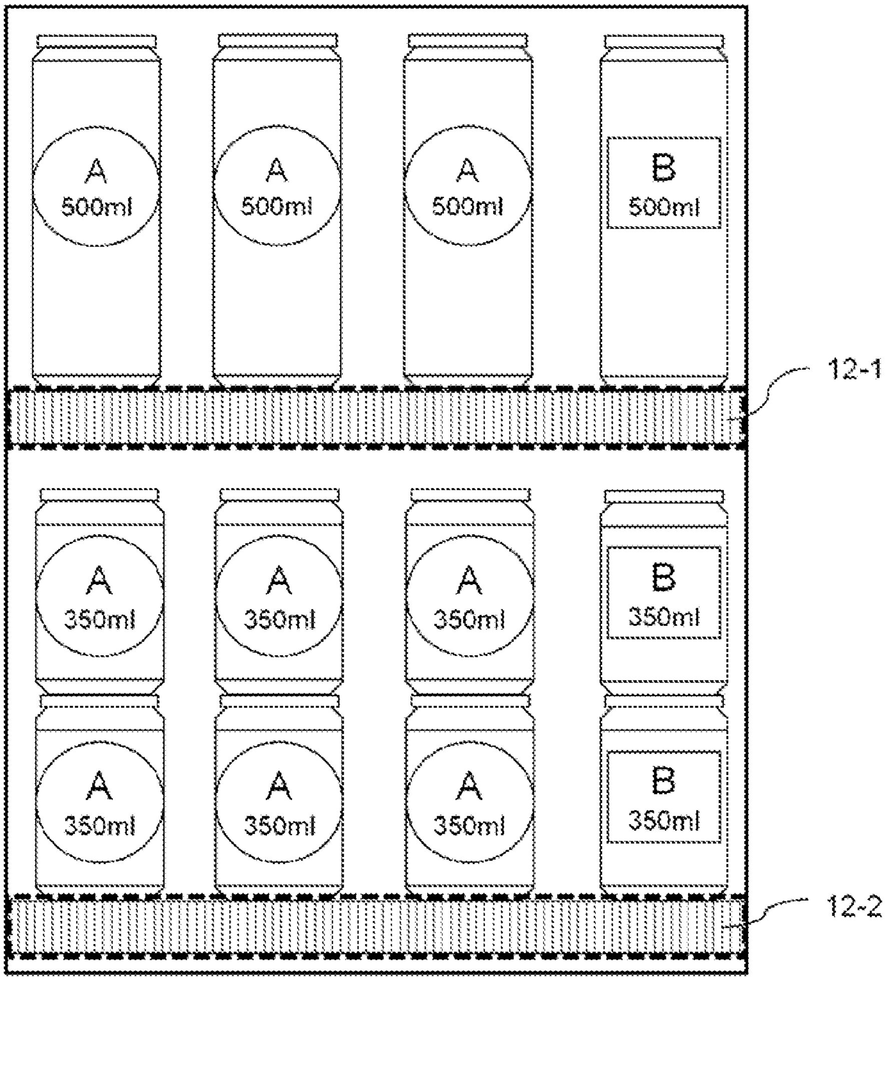
FIG. 12 It is a diagram illustrating a detection result for a placement member on the input image in FIG. 11.

For example, it is assumed that an image such as illustrated in FIG. 11 is given as a processing target to the image analysis system 1. FIG. 11 is a diagram illustrating one example of an image given as a processing target to the image analysis system 1. The placement member detection unit 122 of the same product area determination unit 120 can acquire a result such as illustrated in FIG. 12, by using a machine learning model trained to be able to detect a placement area (for example, a shelf board). FIG. 12 is a diagram illustrating a detection result of a placement member related to an input image in FIG. 11. The placement member detection unit 122 acquires positional information of an image areas 12-1 and 12-2 enclosed by dotted lines in FIG. 12, and stores the acquired positional information in, for example, the memory 1030 and the storage device 1040 of the information processing apparatus 10. The same product area determination unit 120 can determine a position of a placement member in the image, based on the stored information.

Figure 13:
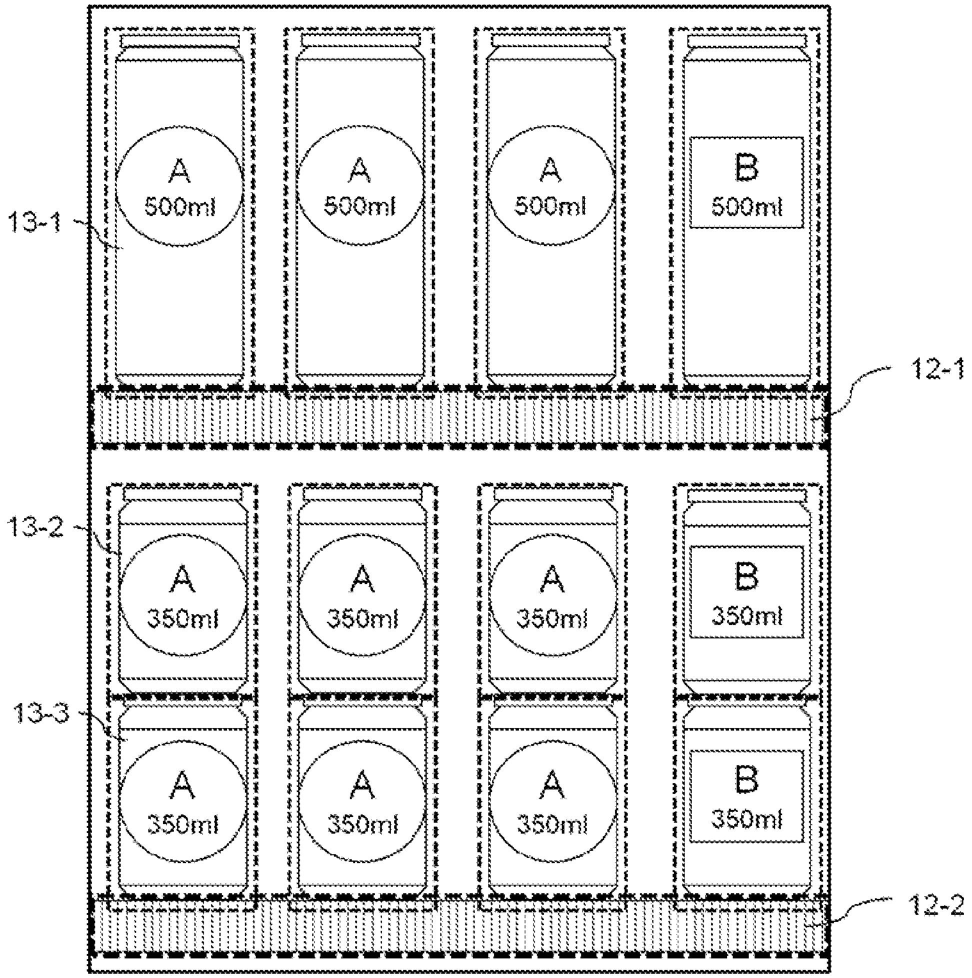
FIG. 13 It is a diagram illustrating a detection result for a product area and a detection result for a placement member on the input image in FIG. 11.

The same product area determination unit 120 determines, based on the positional information of the image area of the placement member acquired by the placement member detection unit 122 and positional information of each product area detected by the product area detection unit 110, whether to execute similarity determination for two adjacent product areas. A specific operation will be described with reference to FIG. 13. FIG. 13 is a diagram illustrating a result of product area detection and a result of placement member detection, regarding the input image in FIG. 11. In the example in the present diagram, a product area 13-1 and a product area 13-2 are adjacent to each other in a vertical direction in the diagram. Further, similarly, the product area 13-2 and a product area 13-3 are also adjacent to each other in the vertical direction in the drawings. The same product area determination unit 120 determines, based on a position of a placement member and a position of a product area such as illustrated in FIG. 13, whether to execute similarity determination for two product areas adjacent to each other in the vertical direction in the drawings. For example, there is a placement member between the product area 13-1 and the product area 13-2 adjacent to each other in the vertical direction in the diagram. In this case, the same product area determination unit 120 does not execute the processing for determining a same product area for the product area 13-2 and the product area 13-3 adjacent to each other with the placement member in between. Meanwhile, there is no placement member between the product area 13-2 and a product area 13-3 adjacent to each other in the vertical direction in the drawing. In this case, the same product area determination unit 120 executes the processing for determining a same product area for the product area 13-1 and the product area 13-2 adjacent to each other without a placement member in between. Similarly, the same product area determination unit 120 determines, based on whether there is a placement member in between, whether to execute the processing for determining a same product area also for another combination of adjacent product areas.

Figure 14:
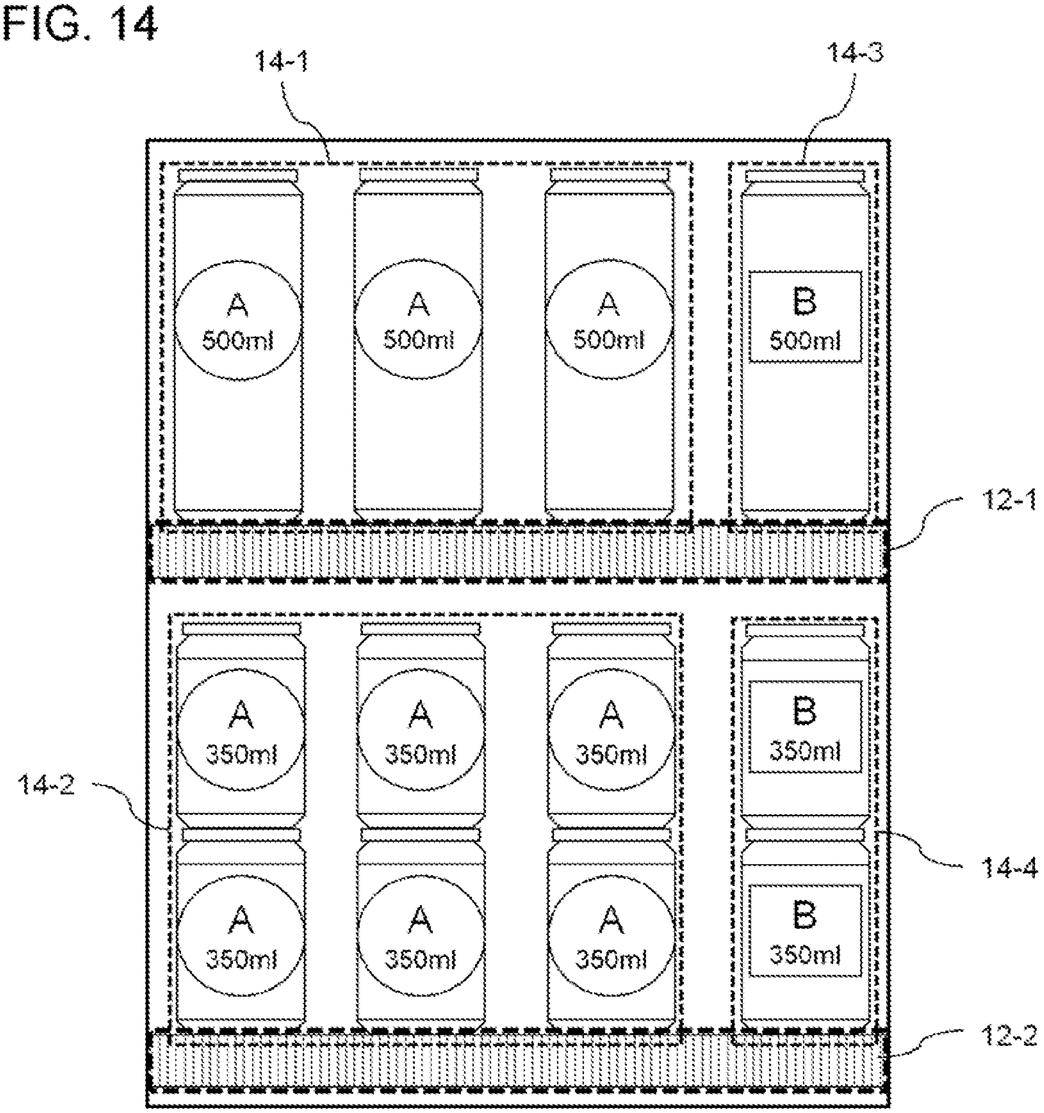
FIG. 14 It is a diagram illustrating a result of processing by the same product area determination unit.

At last, the same product area determination unit 120 outputs a processing result, for example, such as illustrated in FIG. 14, to the product identification unit 130. FIG. 14 is a diagram illustrating a result of the processing by the same product area determination unit 120. In the example in FIG. 14, four same product areas (same product areas 14-1 to 14-4) are determined by the same product area determination unit 120. The same product area 14-1 is an area where a first product (beverage A in a 500 ml container) is displayed. The same product area 14-2 is an area where a second product (beverage A in a 350 ml container) is displayed. The same product area 14-3 is an area where a third product (beverage B in a 500 ml container) is displayed. The same product area 14-4 is an area where a fourth product (beverage B in a 350 ml container) is displayed. The product identification unit 130 executes the product identification processing by using a result of same product area determination by the same product area determination unit 120, such as illustrated in FIG. 14.

Example of Advantageous Effect

In a product shelving unit in a store, different products are often placed on each shelf board (placement member). In other words, a position of a shelf board (placement member) of the product shelving unit is likely to be a border line of an area where same products are displayed. In the present example embodiment, whether there is a placement member between two adjacent product areas is determined based on a position of the placement member detected from an image. Further, when there is a placement member between the two adjacent product areas, it is supposed that those two product areas are not included in a common same product area, and comparison processing in order to determine a same product area is not executed. Thereby, efficiency of same product area determination processing can be improved (a processing load can be reduced).

While the example embodiments of the present invention have been described with reference to the drawings, the present invention is not be construed as limited thereto, and various modifications, improvements, and the like can be made based on knowledge of a person skilled in the art to an extent that they do not depart from the scope of the present invention. Further, various inventions can be formed by combining a plurality of components disclosed in the example embodiments as appropriate. For example, some of the components may be eliminated from all the components described in the example embodiments, or components of different example embodiments may be combined as appropriate.

Further, in a plurality of flowcharts referred to in the above description, a plurality of steps (pieces of processing) is described in order, but an execution order of the steps executed in each example embodiment is not limited to the described order. In each example embodiment, the order of the illustrated steps may be changed to an extent that contents of the steps are not interfered. Further, each of the above-described example embodiments may be combined to an extent that contents thereof do not conflict with each other.

A part or the entirety of the above-described example embodiments may be described as the following supplementary notes, but is not limited thereto.

1.

An image analysis system including:

a product area detection unit that detects a product area of each product from an image capturing a plurality of products;

a same product area determination unit that determines a same product area being an area where a plurality of same products are displayed, based on a result of comparing adjacent product areas with each other; and a product identification unit that selects, as a target, at least one product area from a plurality of product areas included in the same product area, and identifies a product displayed in the same product area by processing the at least one product area selected as the target.

2.

The image analysis system according to supplementary note 1, in which the product identification unit acquires a keypoint of each of a plurality of product areas included in the same product area, and determines the at least one product area to be selected as the target, based on a number of the keypoints acquired for each of the plurality of product areas.

3.

The image analysis system according to supplementary note 1 or 2, in which, when a plurality of product areas are selected as the target, the product identification unit identifies a product displayed in the same product area, by using a result of adding up keypoints of each of the plurality of selected product areas.

4.

The image analysis system according to any one of supplementary notes 1 to 3, in which the same product area determination unit acquires positional information of an image area of a placement member on which a product is placed, and selects product areas to be compared in order to determine the same product area, based on the positional information of the image area of the placement member.

5.

An image analysis method including, by a computer:

detecting a product area of each product from an image capturing a plurality of products;

determining a same product area being an area where a plurality of same products are displayed, based on a result of comparing adjacent product areas with each other;

selecting, as a target, at least one product area from a plurality of product areas included in the same product area; and identifying a product displayed in the same product area, by processing the at least one product area selected as the target.

6.

The image analysis method according to supplementary note 5, further including, by the computer:

acquiring a keypoint of each of a plurality of product areas included in the same product area; and determining the at least one product area to be selected as the target, based on a number of the keypoints acquired for each of the plurality of product areas.

7.

The image analysis method according to supplementary note 5 or 6, further including, by the computer, when a plurality of product areas are selected as the target, identifying a product displayed in the same product area, by using a result of adding up keypoints of each of the plurality of selected product areas.

8.

The image analysis method according to any one of supplementary notes to 7, further including, by the computer:

acquiring positional information of an image area of a placement member on which a product is placed; and selecting product areas to be compared in order to determine the same product area, based on the positional information of the image area of the placement member.

9.

A program causing a computer to execute the image analysis method according to any one of supplementary notes 5 to 8.

REFERENCE SIGNS LIST

1 Image analysis system
10 Information processing apparatus
1010 Bus
1020 Processor
1030 Memory
1040 Storage device
1050 Input/output interface
1060 Network interface
110 Product area detection unit
120 Same product area determination unit
122 Placement member detection unit
130 Product identification unit
20 Terminal

What is claimed is:

1. An image analysis system comprising:

at least one memory configured to store instructions; and at least one processor configured to execute the instruction to perform operations comprising:

detecting a product area of each product from an image capturing a plurality of products;

determining a same product area being an area where a plurality of same products are displayed, based on a result of comparing adjacent product areas with each other; and selecting, as a target, at least one product area from a plurality of product areas included in the same product area; and identifying a product displayed in the same product area by processing the at least one product area selected as the target, wherein selecting the at least one product area comprises:

acquiring keypoints of each of a plurality of product areas included in the same product area; and determining the at least one product area to be selected as the target, based on a number of the keypoints acquired for each of the plurality of product areas included in the same product area.

2. The image analysis system according to claim 1, wherein the operations further comprise, when a plurality of product areas are selected as the target, identifying a product displayed in the same product area, by using a result of adding up keypoints of each of the plurality of selected product areas.

3. The image analysis system according to claim 1, wherein the operations further comprise acquiring positional information of an image area of a placement member on which a product is placed, and selecting product areas to be compared in order to determine the same product area, based on the positional information of the image area of the placement member.

4. The image analysis system according to claim 1, wherein the operations further comprise determining the number of the keypoints acquired for each of the plurality of product areas included in the same product area.

5. The image analysis system according to claim 1, wherein a combination of the determining the same product area and selecting, as the target, the at least one product area from the plurality of product areas included in the same product area reduces a processing load for the at least one processor.

6. An image analysis method comprising, by a computer:

detecting a product area of each product from an image capturing a plurality of products;

determining a same product area being an area where a plurality of same products are displayed, based on a result of comparing adjacent product areas with each other;

selecting, as a target, at least one product area from a plurality of product areas included in the same product area; and identifying a product displayed in the same product area by processing the at least one product area selected as the target, wherein selecting the at least one product area comprises:

acquiring keypoints of each of a plurality of product areas included in the same product area; and determining the at least one product area to be selected as the target, based on a number of the keypoints acquired for each of the plurality of product areas included in the same product area.

7. The image analysis method according to claim 6, further comprising, by the computer, when a plurality of product areas are selected as the target, identifying a product displayed in the same product area, by using a result of adding up keypoints of each of the plurality of selected product areas.

8. The image analysis method according to claim 6, further including, by the computer:

acquiring positional information of an image area of a placement member on which a product is placed; and selecting product areas to be compared in order to determine the same product area, based on the positional information of the image area of the placement member.

9. A non-transitory computer-readable medium storing a program for causing a computer to perform operations comprising:

detecting a product area of each product from an image capturing a plurality of products;

determining a same product area being an area where a plurality of same products are displayed, based on a result of comparing adjacent product areas with each other;

selecting, as a target, at least one product area from a plurality of product areas included in the same product area; and identifying a product displayed in the same product area by processing the at least one product area selected as the target, wherein selecting the at least one product area comprises:

acquiring keypoints of each of a plurality of product areas included in the same product area; and determining the at least one product area to be selected as the target, based on a number of the keypoints acquired for each of the plurality of product areas included in the same product area.

* * * * *